(12) United States Patent
Miniailuk

(10) Patent No.: US 12,516,911 B2
(45) Date of Patent: Jan. 6, 2026

(54) COMBINED ARMOR PLATE

(71) Applicant: Sergii Miniailuk, Novoushytskyi raion (UA)

(72) Inventor: Sergii Miniailuk, Novoushytskyi raion (UA)

( * ) Notice: Subject to any disclaimer, the term of this patent is extended or adjusted under 35 U.S.C. 154(b) by 11 days.

(21) Appl. No.: 18/614,940

(22) Filed: Mar. 25, 2024

(65) Prior Publication Data

US 2025/0251221 A1 Aug. 7, 2025

(30) Foreign Application Priority Data

Feb. 1, 2024 (UA) .............................. a 2024 00545

(51) Int. Cl.
*F41H 5/04* (2006.01)
*B32B 5/18* (2006.01)
*B32B 7/022* (2019.01)

(52) U.S. Cl.
CPC ................. F41H 5/04 (2013.01); B32B 5/18 (2013.01); B32B 7/022 (2019.01); *F41H 5/0435* (2013.01); *F41H 5/0464* (2013.01); *B32B 2571/02* (2013.01)

(58) Field of Classification Search
CPC ......... F41H 5/04; F41H 5/0464; F41H 5/0435
See application file for complete search history.

(56) References Cited

U.S. PATENT DOCUMENTS

| | | | | |
|---|---|---|---|---|
| 7,540,228 | B1* | 6/2009 | Cronin | F41H 5/0421 2/2.5 |
| 2010/0080971 | A1* | 4/2010 | Neal | A41D 31/245 428/521 |
| 2012/0174754 | A1* | 7/2012 | Salisbury | C04B 35/63456 89/917 |
| 2016/0131457 | A1* | 5/2016 | Bain | F41H 5/0492 89/36.02 |
| 2017/0241747 | A1* | 8/2017 | Ganor | B32B 5/18 |

* cited by examiner

*Primary Examiner* — Jonathan C Weber
(74) *Attorney, Agent, or Firm* — Nadya Reingand

(57) ABSTRACT

A combined armor plate is claimed. The combined armor plate is formed by soft and hard armor plates, the hard armor plate is arranged in a front part, the soft plate is arranged in a rear part. It comprises one or several hard armor plates having a total area smaller than a total area of the soft armor plate. The hard armor plates and the soft armor plate are interconnected such that they form firm and uniform structure in each formed hard ballistic part on each connection area between the soft armor plate and the hard armor plates. Soft ballistic parts have lower firmness and lower thickness of a ballistic material than the combined armor plate in locations of the hard ballistic parts. Technical effect: increasing effective ballistic protection area and resistance of the hard armor plate and the soft armor plate to penetration and blunt trauma effect.

3 Claims, 3 Drawing Sheets

COMBINED ARMOR PLATE

FIELD OF THE INVENTION

The invention relates to military and special fields, in particular, to individual ballistic protection equipment, and it can be used as a part of protective elements, body armors, in other tools for individual human protection against hitting with bullets of various firearms, wreckage, shards, pieces of explosive weapons. The invention is a combined armor plate.

PRIOR ART

At least two main types of armor plates for body armors are known: soft (flexible) ones and hard ones. The terms "soft" and "hard" relative to protective ballistic armor plates are used officially in this field of the art, and these terms have specific precise meanings for technical parameters of materials. "Soft ballistic armor plate" (Soft Armor) is a lightweight protective armor plate that is made based on special fabrics or non-woven materials and that ensures protection against low-speed pistol bullets and non-sharp shards moving. The soft ballistic armor plates ensure no protection against sharp high-speed bullets (shot by rifles) and against sharp shards, have a high deformation of a front side and shorter shelf life. The hard armor plates (Hard Armor) are protective armor plates which are made of hard materials (steel, titanium, pressed UHMWPE, ceramics etc.). The hard armor plates ensure a greater protection level than the soft armor plates, they are resistant to high-speed shard-ended bullets and shards. Drawbacks of the hard armor plates include a lack of flexibility and their large weight. At the same time, the hard armor plates have lower parameters of a blunt deformation, and, in certain structural implementations, it is possible to achieve its full absence which is not possible when using the soft armor plates.

A depth of the blunt deformation for the body armors of all protection classes must meet the following requirements:
for externally worn body armors—not more than 25 mm;
for concealable body armors—not more than 35 mm (National standard of Ukraine. DSTU 8782:2018. Individual protection equipment. BODY ARMORS. Classification. General technical specifications. Official release—Kyiv, SE "UkrNDNC", 2019 [1]).

Therefore, the soft ballistic armor plates are used predominantly for human protection against high-speed striking elements (pistol bullets, blunt (non-sharp) shards, cold weapons and other similar elements). The soft ballistic armor plates also possess a certain flexibility which makes it convenient to use them in body armors, when it is necessary to preserve maximum mobility, e.g., when they are used as parts of concealable body armors, in lightweight police body armors, etc.

As mentioned above, the hard body armors are used predominantly for human protection against high-speed and sharp striking elements, when it is necessary to ensure a maximum protection level, e.g., when they are used as parts of combined, assault body armors.

Also, combined semi-hard body armors having a basic protective structure based on special fabrics or non-woven materials with additional hard protective armor plates are known.

Therefore, according to the special classification of protection classes of body armors, according to the standards DSTU 8782:2018 [1], NIJ 0101.04/NIJ 0101.06 (USA), at least three types of body armors are known and are the most widespread for use, where various types of the armor plates and protective materials are used, namely:
soft body armor (type A) which utilizes soft and flexible ballistic armor plates that bend in different directions; these bulletproof body armors usually utilize a soft armor at levels IIA, II and IIIA NIJ (USA) and 1, 2 of the DSTU Ukraine;
semi-hard body armor (type B) that utilizes ballistic plates (hard armor) combined with soft ballistic armor plates (standard army body armor);
hard body armor (type B) that is represented by armor plates (Hard Armor) based on hard armor plates (for example, plate carriers). These armor plates are hard plates that are made predominantly of a compressed polyethylene with a ceramic front part ($Al_2O_3$, SiC, $B_4C$) or profiled steel sheets (Armox, Ramor, Swebor). In Ukraine, ballistic plates are made predominantly with dimensions 30×25 cm and a flat, monogonal or polygonal shape (Website "Wikipedia, the free encyclopedia": Bulletproof vest. [Electronic source].—Access mode: https://uk.wikipedia.org/wiki/Бронежилет#Класи_захисту, access date 11.01.2024 [2]; Website "VELMET": CLASSIFICATION OF BULLETPROOF VESTS AS PER DSTU 8782:2018, NIJ 0101.06. [Electronic source].—Access mode: https://velmet.ua/klasifikatsiya-bronejiletiv-standart-dstu-8782-2018-nij-0101-06.html, access date 11.01.2024 [3]).

Soft and hard ballistic armor plates have their own advantages and drawbacks during their practical use individually and in combination as parts of combined semi-hard body armors.

The soft ballistic armor plates are advantageous in their relatively light weight, flexibility and elasticity, and, thus, usage convenience. However, as mentioned above, they do not protect the human body against high-speed and sharp striking elements. Furthermore, a significant drawback of the soft ballistic armor plates lies in that they have a relatively low level of protection against a blunt trauma. "Blunt trauma" is a damage of human outer integuments and inner organs as a result of non-penetration of the individual protective equipment (body armor, helmet, etc.) with a bullet or other types of striking elements of weapons. All types of the blunt action are caused by transmission of an impulse and kinetic energy of the bullet/shard to the armor plate that, in turn, results in loading of the body with a shock wave, a local hit with the displaced body armor, while creating a deformation dome (convexity) and acceleration of the human body or individual body regions that took a shock effect of the bullet or shard (Website "Wikipedia, the free encyclopedia": Behind-armor contusion injury. [Electronic source].—Access mode: https://ru.wikipedia.org/wiki/Заброневая_контузионная_травма, access date 14.01.2024 [4]).

According to existing current researches on animals, a percentage of mortality is significantly increased in cases of a blunt trauma having a depth of more than 34 mm, e.g., from 40 mm to 44 mm. Therewith, various death causes of the animals as a result of the blunt trauma were recorded: cardiac arrhythmia, ischemia, sharp decline of arterial saturation, hematoma of lungs and other organs, occurrence of emphysema, serious disorders of lung function, blood flow, brain and nervous system (Website "OXFORD academic": Severe Lung Contusion and Death after High-Velocity Behind-Armor Blunt Trauma: Relation to Protection Level. Dan Gryth, David Rocksén, PhD, Jonas K. E. Persson, MD, PhD, Ulf P. Arborelius, PhD, Dan Drobin, MD, PhD, Jenny Bursell, BSc, Lars-Gunnar Olsson, RT, Thomas B. Kjellström, MD, PhD. [Electronic source]. —Access mode: https://academic.oup.com/milmed/article/172/10/1110/4578114, access date 15.01.2024 [5]). Said researches were conducted using various weapons and various ballistic materials in order to achieve various diameters and striking degree of the blunt trauma. Therefore, it is fully understood that the striking by the blunt trauma depends on a combination of action of the striking element as well as properties and parameters of the ballistic plates that are hit with the bullet or shard. Thus, in order to ensure reduction of the diameter and striking force of the blunt trauma, it is necessary to improve the existing structures of the armor plates using combined ballistic armor plates.

The hard armor plates are more effective in terms of protection level and ability to restrain various striking elements. Also, the hard armor plates possess a much higher level of protection against the blunt trauma (as compared to the soft ballistic armor plates). However, the hard armor plates possess a greater weight, are non-flexible, and, thus, they are less ergonomic and less convenient in use as compared to the soft ones.

In the combined (semi-hard) body armors, at least two materials (soft and hard) arranged in a "layer-by-layer fashion" are used to provide protection. Furthermore, in the structure of the standard semi-hard army body armor, a separate outer pouch (e.g., a waterproofing bag) is usually used for the hard/soft armor (for ballistic plates). In the same way, the soft ballistic armor plates also have their own separate outer pouch (bag). Therefore, the hard armor plates in their own pouches and the soft ballistic armor plates in their own pouches that are arranged in the "layer-by-layer fashion" in the structure of one standard army body armor of the type "B" ensure an effective double protection. However, at the same time, these hard and soft ballistic armor plates in the separate pouches in the known standard army semi-hard body armors are separated from each other, they do not form a single uniform structure, and in most of cases they "operate" and perform protective functions not as a "single" ballistic armor plate, but each separately, without utilizing useful properties of another material or using them insignificantly. Furthermore, during any user moves, the separated hard and soft armor protective bags slide between each other, thereby making them inconvenient for any long-term usage. Also, the standard army semi-hard body armors are rather complex and expensive in manufacturing.

Any armor plate (both hard and soft) has its own effective protection area, where edges of this protective element (both hard and soft) always have lower ballistic protection as compared to the main area of this armor plate. That is, when a bullet or a shard hits the edge of any armor plate, it will penetrate, and the human body will be injured and damaged in most cases. This is an inherent physical and mechanical property of most of the protective materials, since a smaller area is involved at the edge of any ballistic material during protection and withstanding a hit as compared to places that are located closer to a central part. Thus, the separated armor plates comprised in the soft and hard body armors as well as the separated (layered) soft and hard protective materials comprised in the combined (semi-hard) body armor have a decreased effective area of the ballistic protection relative to their actual total area due to greater vulnerability of their edges. For example, if the total physical area of the hard armor plate is 7 dm2, the effective area of the ballistic protection of this armor plate in fact will be, e.g., 6 dm2, due to vulnerability of its edges. Since the hard and the soft ballistic armor plates are separated, the presence of the soft ballistic armor plate under the hard armor plate comprised in the standard army semi-hard body armor does not increase the effective area of the ballistic protection of the armor plate in any way, and its edges still remain more vulnerable and capable of being penetrated. Therefore, it is clear that there is a problem of vulnerability and penetration of the edges of the armor plates, and, consequently, there is also a problem of the reduced effective area of the ballistic protection of the armor plates, in particular, hard armor plates, e.g., that are comprised in the semi-hard body armors. An actual increase of the effective area of the ballistic protection of the armor plates could allow to enhance useful properties of these products significantly and to increase chances of saving health and life of their users.

As mentioned above, the soft ballistic armor plates possess a rather low level of protection against the blunt trauma. That is, if the bullet hits, for example, the soft armor plate, then even no penetration occurs, a high area and depth of the blunt trauma will appear, and it may lead to the death of the person. Thus, the hard armor plates possess a higher level of protection against the blunt trauma as compared to the soft ones. Therefore, there is a need to reinforce and strengthen the soft ballistic armor plates against the blunt trauma effect, including in certain (even small) parts of the armor protection that are located in vital areas of the human (heart, liver, lungs, groin, head, other locations).

A structure of a bendable bulletproof plate is known, the plate is a combined armor plate that is formed by a soft ballistic armor plate and two hard armor plates (Chinese invention patent CN112304161A, IPC F41H 1/02, F41H 5/04, F41H 5/0471, publ. on Feb. 2, 2021 [6]). This invention is intended to allow a smooth connection between a soft bulletproof zone and a hard bulletproof zone, where a firmness of the soft bulletproof zone may be adjusted by the structure in order to achieve 360-degree bending. However, this structure is not intended to increase the effective area of the ballistic protection against penetration of edges of the hard armor plate, and this structure does not allow to increase a resistance of the soft ballistic material to the blunt trauma effect, in particular, in specifically selected vital regions of the human user body. This structure does not provide flexibility in a full extent, since the hard and soft parts of the armor plate are not arranged in the structure: when viewed in a vertical cross-section, a hard ballistic material layer in an upper (front) part and a soft ballistic material layer in a lower (rear) side are connected along the entire vertical plane. Also, in this structure, it is difficult to ensure non-creasing of lower layers of the soft armor plate in view of fixation of its layers in the upper part by connecting the soft and the hard components of the armor plate.

The closest analog of the claimed invention is a structure of a hard soft ballistic armor that is a combined armor plate that is formed by a soft ballistic armor plate and a hard armor plate, wherein the hard armor plate is arranged in a front part of the combined armor plate, while the soft ballistic armor plate is arranged in a rear part of the combined armor plate (USA invention U.S. Pat. No. 9,200,872B1, IPC F41H 1/02, F41H 5/04, F41H 5/08, publ. on Jan. 12, 2015 [7]). Said "hard soft ballistic armor" is intended to decrease and, in certain cases, to prevent injuring of chest, trunk, stomach, legs, arms, feet, ankle, hand, wrist, fibula, lower leg, radial and ulnal bones of soldiers which wear this armor plate and encounter anti-personnel mines in expected and unexpected locations or firearms fire. However, this structure is complex in manufacturing, it has rather high areas of the hard ballistic parts and small areas of the soft ballistic parts, thereby increasing its weight, reducing its elasticity and flexibility that, in turn, makes this armor inconvenient for use. Furthermore, this invention does not allow to increase the resistance of the soft ballistic material to the blunt trauma effect, in particular, in specifically selected vital regions of the human user body, and does not allow to increase the effective area of the ballistic protection against penetration of the edges of both hard and soft ballistic armor plates. The main drawback of this solution is preservation a number of layers of the ballistic material in soft and hard structures. After compression with different pressure values, with consideration of the compression degree (3-5 times), the soft part of the armor plate will be significantly thicker than the hard one which will ensure an insignificant degree of flexibility and convenience. Identical number of the layers of the ballistic material that is used to form the hard part of the armor plate as well as the presence of this number of layers on almost the entire area of the soft ballistic armor plate do not allow to preserve flexibility and elasticity of the major part of the armor plate, and, thus, do not allow to reduce the total weight of the armor plate, thereby negatively affecting the usage convenience of the armor plate.

A technical objective of the present invention is to provide a structure of a combined armor plate that could increase a ballistic protection in critical locations (achievement of "non-penetration" and minimization of a blunt trauma effect) and increase an effective area of the ballistic protection, while preserving usage convenience.

Technical effects that are achieved by a set of all essential features, including novel features of the invention, include:
increasing the effective area of the ballistic protection and resistance of the combined armor plate to penetration and blunt trauma effect, while at the same time preserving flexibility and elasticity of a major part of the armor plate, and, thus, preserving the usage convenience of the armor plate without any significant increase of its weight;
increasing the ballistic protection against penetration and the blunt trauma effect in specifically selected locations of the combined armor plate, and, thus, in specifically selected vital regions of a human user body.

SUMMARY OF THE INVENTION

The objective is achieved by providing a combined armor plate 1 that is formed by a soft ballistic armor plate 2 and a hard ballistic armor plate 3, and the hard armor plate 3 is arranged in a front part of the combined armor plate 1, while the soft ballistic plate 2 is arranged in a rear part of the combined armor plate 1.

Novel features are as follows: the combined armor plate 1 comprises one or several hard armor plates 3, each having a total area that is smaller than a total area of the soft ballistic armor plate 2, and the hard armor plate 3 or several hard armor plates 3 and the soft ballistic armor plate 2 are interconnected such that they form a firm and one-piece uniform structure in each formed hard ballistic part 5 of the combined armor plate 1 on an entire area 4 or entire areas 4 of connection between the soft ballistic armor plate 2 and each of the hard armor plates 3, and soft ballistic parts 6 have a lower firmness and a lower thickness of a ballistic material than a firmness and a thickness of the combined armor plate 1 in locations of the formed hard ballistic parts 5.

For some specific conditions and applications of the inventive structure, the claimed combined armor plate is characterized by the following features that develop and specify a set of features provided in independent claim.

The firm uniform one-piece structure in the location of the formed hard ballistic part 5 has a straight flat or curved or rounded or multi-radius complex anatomic shape.

The combined armor plate 1 comprises a foamed material in the rear part.

The combined armor plate 1 comprises one or several hard armor plates 3 that are arranged within a single region of the combined armor plate 1, the region is intended to protect a human body region near a vital organ.

BRIEF DESCRIPTION OF THE INVENTION

As mentioned above, the majority of widespread structures of combined (semi-hard) body armors utilize at least two ballistic materials (soft and hard), and each of them is additionally "packed" into a waterproofing bag, and they are joint (bonded, sealed) and arranged in a "layer-by-layer fashion" [3]. This product is intended to protect the entire trunk. The above-mentioned analogous "hard soft ballistic armor" [7], according to drawings and description of the manufacturing process, also has an overall continuous hard structure only with small regions of the soft ballistic parts in order to preserve flexibility and elasticity that are still limited in this structure. Therefore, said products have high weight as well as small elasticity and flexibility, and, thus, they are not convenient for long-term use and for use, e.g., in specific conditions, in particular, "under clothes", or for professionals of special forces and units, when it is necessary to have lightweight, flexible and elastic protection, while at the same time, have certain regions or one region of increased effective reinforced area of ballistic protection having increased resistance to penetration and blunt trauma effect in specifically selected vital regions of the human user body.

According to the claimed invention, the combined armor plate 1 comprises one or several hard armor plates 3, each having the total area that is less than the total area of the soft ballistic armor plate 2. That is, in order to arrange said one or several hard armor plates 3 in the combined armor plate 1, only specific regions (near vital regions of the human user body) to be reinforced "at the background" of the soft ballistic armor plate 2 are selected. When fastening the relatively small hard armor plates 3 with the soft ballistic armor plate 2, in order to achieve a maximum effect of increasing the effective area of the ballistic protection and to enhance the ballistic protection against penetration and the blunt trauma effect, it will be insufficient to perform a standard widely known sealing or gluing or bonding or another method for joining layers in the region of arrangement of the hard armor plates 3 that still would result in even microscopic gaps, plies, cavities remaining between these layers of ballistic materials. The presence of "layering" with these gaps, plies, cavities in the structure of any armor plate will "deprive" each of the existing layers of ballistic materials of ability to "utilize" their own ballistic properties simultaneously and in combination with ballistic properties of the second ballistic armor plate at the moment of hitting with a bullet or a shard. That is, any hard armor plate that is separated (uniformly non-joint) from the soft ballistic armor plate, for example, in the structure of the combined armor plate will always lose the effective area of the ballistic protection along its edges, as described above. At the same time, the soft ballistic armor plate that is separated (uniformly non-joint with the hard armor plate) and is not reinforced with the hard armor plate, for example, in the structure of the same combined armor plate, always has low and insignificant protection against the blunt trauma at least on separate vital regions.

According to the claimed invention, the hard armor plate 3 or several hard armor plates 3 and the soft ballistic armor plate 2 are interconnected such that they form a firm and one-piece uniform structure in each formed hard ballistic part 5 of the combined armor plate 1 on the entire area 4 or entire areas 4 of connection between the soft ballistic armor plate 2 and each of the hard armor plates 3, in particular, on specifically selected parts of the combined armor plate 1 that are arranged in the small region of the vital region (on in several regions of the vital region) of the human user body. Therefore, uniform zones being the hard ballistic parts 5 are provided on the area of the soft ballistic armor plate 2 of the structure of the combined armor plate 1, and in said ballistic parts, certain regions of the soft ballistic armor plate 2 are reinforced with the hard armor plates 3, and said ballistic parts gain the increased effective area of the ballistic protection both along the entire area of the hard armor plate 3 and along its edges. That is, owing to formation of the one-piece uniform structure of the soft ballistic armor plates 2 with the hard armor plates 3, the effective area of the ballistic protection is increased in locations of such connections, as well as it is increased at the edges of the hard armor plates 3, where the ability of penetration by the bullet or shard is increased due to integral joining of the edges of the hard plates 3 with the soft ballistic armor plate 2, thereby increasing, upon integral connection of two ballistic armor plates, a probable diameter of the effective area of the ballistic protection when the bullet or the shard hits the edge of the hard armor plate 3. Therefore, the hard armor plate 3 starts to "operate" in combination with the soft ballistic armor plate 2 by "utilizing" its useful ballistic properties, and the structure of the combined armor plate 1 gains improved protective properties in zones of the newly formed hard ballistic parts 5, on the edges as well as around the edges. Therewith, in those zones of the newly formed hard ballistic parts 5, the soft ballistic armor plate 2 gains enhancement of the ballistic protection both against penetration and, at the same time, against the blunt trauma effect due to formation of the one-piece uniform structure of the soft ballistic armor plates 2 with the hard armor plates 3. That is, the soft ballistic armor plate 2 (that is arranged as a rear protective layer in the integrally formed structure) starts to "operate" in combination with the upper structured hard armor plate 3 by "utilizing" its useful ballistic properties simultaneously with its own properties: hardness and firmness of the hard armor plate 3 "takes" main destructive energy of the striking element, and much lower energy of the bullet or shard affects the soft ballistic armor plate 2 (after the hard one). In view of this, the structure of the combined armor plate 1 gains enhanced protective properties and ballistic resistance in specifically selected locations of the combined armor plate and, thus, in specifically selected vital regions of the human user body that become more protected by the newly formed hard ballistic parts 5 both to penetration and blunt trauma effect.

According to the claimed invention, in contrast to the mentioned analogs [6], [7], soft ballistic parts 6 have smaller firmness and smaller thickness of the ballistic material than the firmness and thickness of the combined armor plate 1 in the locations of formation of the hard ballistic parts 5, where there is the one-piece uniform structure provided by the soft ballistic armor plate 2 and the hard armor plate 3. Since the area of each hard armor plate 3 is much smaller than the total area of the soft ballistic armor plate 2, i.e., the hard armor plates 3 are small, their total "layer-by-layer area" can be increased significantly (by overlapping and sealing a plurality of layers to form the hard armor plate 3 and, thus, the certain hard ballistic part 5) without losing any flexibility, elasticity and lightness of the entire combined armor plate 1 with its main area being the soft ballistic armor plate 2. According to the conditions of provision and "operation" of the hard ballistic materials, the greater the total layer-by-layer area of the ballistic material is (the more layers are pressed and sealed in height), the smaller its total area along the plane (length/width) may be. Therefore, it is allowed, depending on the required size of the plane of the hard armor plate 3 and, thus, on the size of the plane of the certain hard ballistic part 5, to select the required number of the sealed layers and, thus, to form the required hardness and firmness of these regions (hard ballistic parts 5) that always must have greater firmness and greater thickness than the firmness and thickness of the sift ballistic armor plate 2 in order to achieve a maximum effective ballistic resistance. Therewith, the hard armor plate is arranged in the vertical cross-section in the upper (front) part of the combined armor plate, while the soft ballistic armor plate is arranged in the lower (rear) part and has no fixation in the upper part to increase flexibility.

Therefore, all the mentioned essential features of the invention allow to creation of the structure of the combined armor plate that provides an increase of the effective area of the ballistic protection and resistance of the hard armor plate to penetration and increase of the effective area of the ballistic protection and resistance of the soft ballistic material to the blunt trauma effect.

In separate embodiments of the invention, the firm uniform one-piece structure in the location of the formed hard ballistic part 5 may have a straight flat or curved or rounded or multi-radius complex anatomic shape. This structural solution allows to integration of the hard armor plates 3 around various regions of the user's body: chest, stomach, shoulders, and other locations, in order to achieve convenience and ergonomics of the product usage.

Also, in separate embodiments of the structure, the rear part of the combined armor plate 1 may comprise a foamed material being an additional layer for reduction of human injury after hitting with the striking elements, including for reduction of the blunt trauma effect.

Depending on a future intended purpose and use of the product, in separate embodiments, the combined armor plate 1 may comprise one or several hard armor plates 3 that are arranged within a single region of the combined armor plate 1, the region is intended to protect one certain human body region near the vital organ.

Said additional structural features of the invention allow to enhance and to improve the technical effects that are achieved by the main essential features of the invention.

BRIEF DESCRIPTION OF DRAWINGS

Practical implementation and industrial applicability of the combined armor plate is explained by schematic views of the structure in which.

NOMENCLATURE LIST OF MAIN STRUCTURAL ELEMENTS OF THE DEVICE

1—combined armor plate;
2—soft ballistic armor plate;
3—hard armor plate;
4—area of the formed firm and one-piece uniform structure made of the soft ballistic armor plate 2 and the hard armor plate 3;
5—hard ballistic part of the combined armor plate 1;
6—soft ballistic parts of the combined armor plate 1;
7, 8—locations of recesses of the blunt trauma in photo 2.

DETAILED DESCRIPTION OF THE INVENTION

Figure 1:
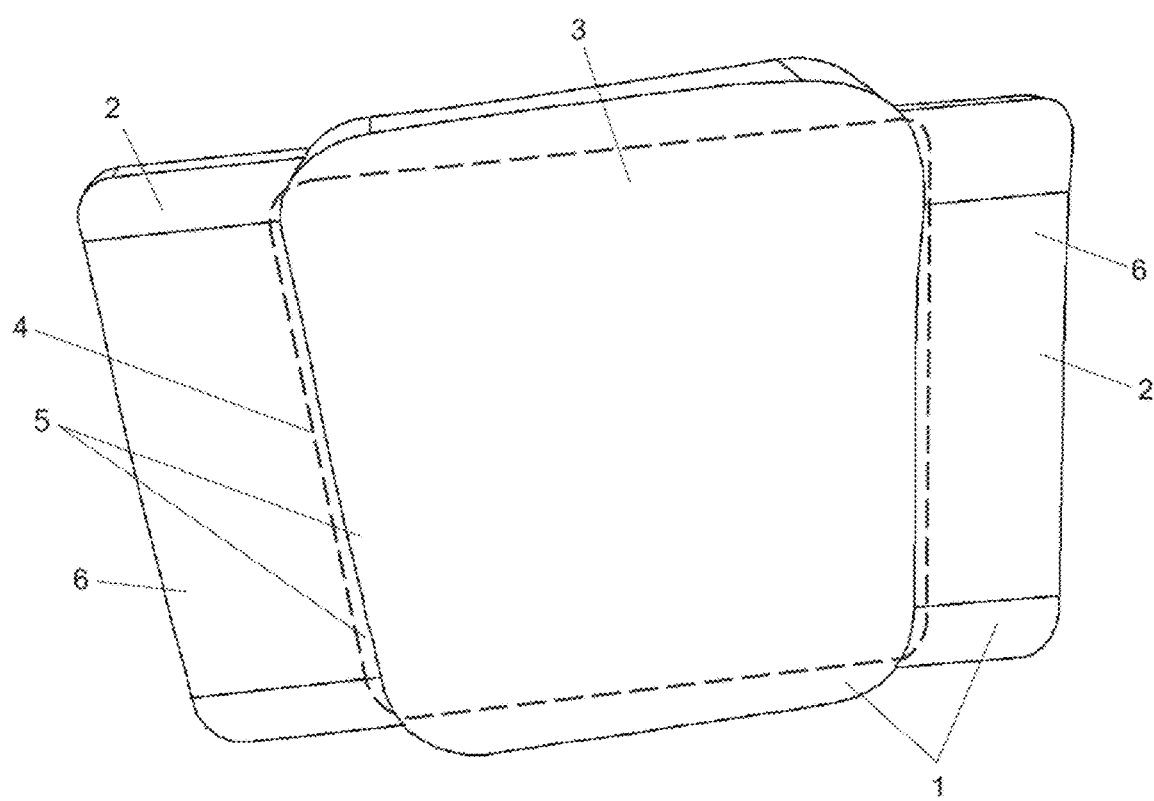
FIG. 1 illustrates the combined armor plate (front view)
Figure 2:
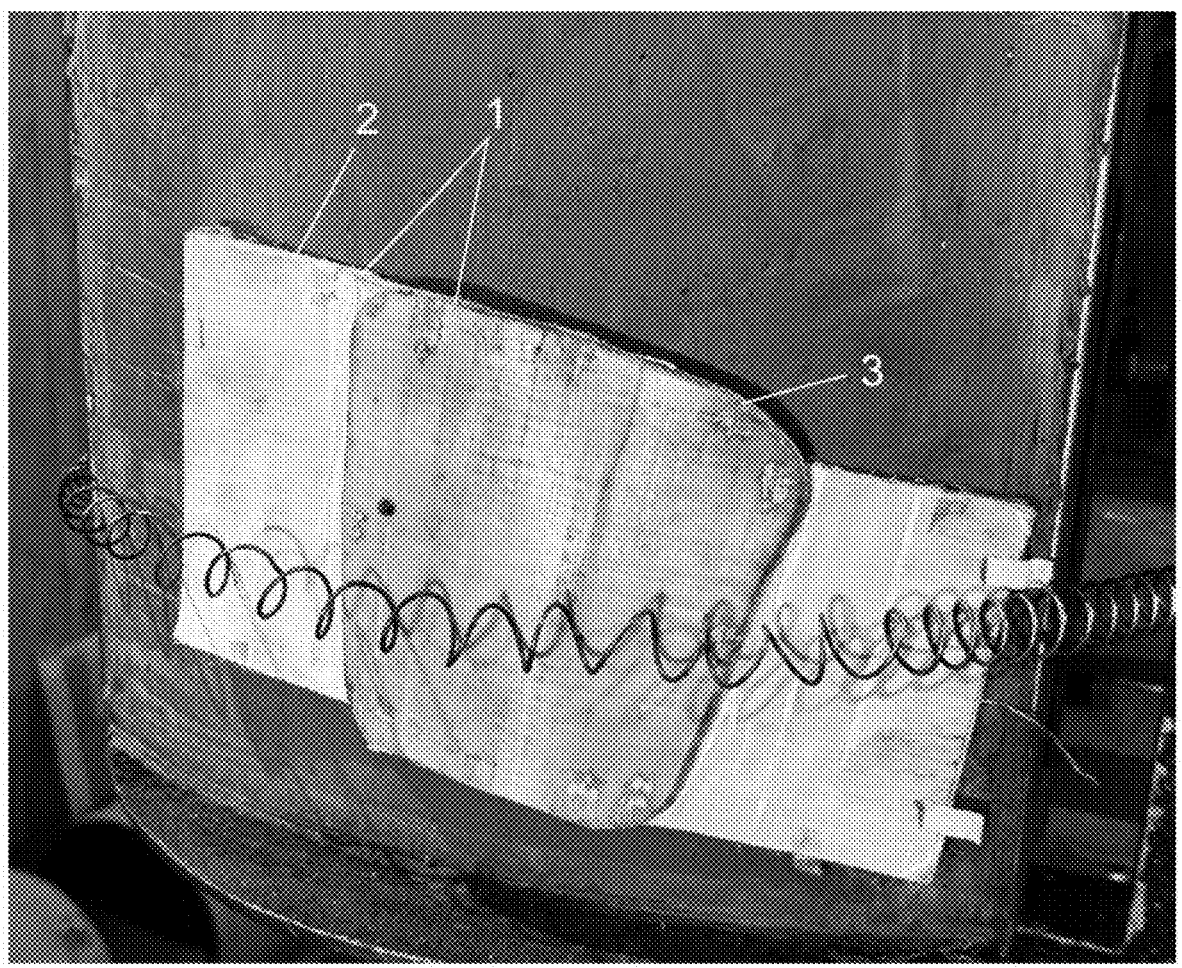
FIG. 2 (photo 1) illustrates a visual appearance of the combined armor plate on a model.
Figure 3:
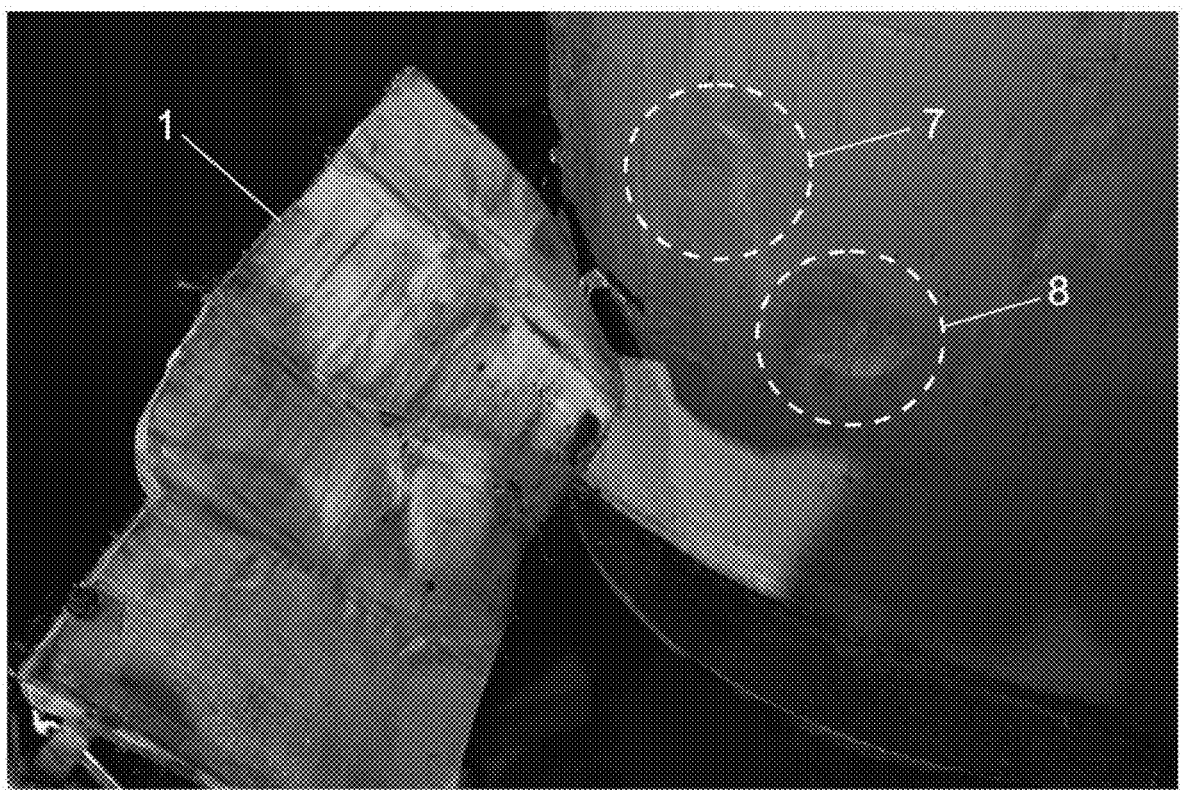
FIG. 3 (photo 2) illustrates a result of testing of the combined armor plate (in the hard ballistic part 5) for the ballistic resistance and degree of the blunt trauma: no penetration, depth of the "trauma" is less than 10 mm (positions 7, 8).

The combined armor plate 1 is formed by the soft ballistic armor plate 2 and one or several hard armor plates 3 (FIG. 1). The total area of one or each of the several hard armor plates 3 is smaller than the total area of the soft ballistic armor plate 2. The hard armor plate 3 is always arranged in the front part of the combined armor plate 1 and, thus, the soft ballistic armor plate 2 is arranged in the rear part of the combined armor plate 1. In separate embodiments of the invention, the rear part of the combined armor plate 1 comprises a foamed material that is arranged as an additional layer behind the soft ballistic armor plate 2 in order to reduce the traumatic effect caused by intrusion of the striking element.

According to the invention, the one hard armor plate 3 or several hard armor plates 3 and the soft ballistic armor plate 2 are interconnected such that the firm and one-piece uniform structure is formed in each hard ballistic part 5 formed by these two ballistic armor plates 2 and 3 on the entire area 4 or on several areas 4 of the connection between the soft ballistic armor plate 2 and each of the hard armor plates 3. Therewith, the hard armor plate 3 (or several hard armor plates 3) and the soft ballistic armor plate 2 are connected such that said formed firm and one-piece uniform structure does not have even microscopic gaps, plies, cavities between the layers of the ballistic materials. Therefore, uniform zones are provided on the area of the soft ballistic armor plate 2 being hard ballistic parts 5 (FIG. 1), where regions of the soft ballistic armor plate 2 are reinforced with the hard armor plates 3. Zones of the soft ballistic armor plate 2 that are not reinforced with the hard armor plates 3 are soft ballistic parts 6 (FIG. 1). Owing to the described connection, the hard armor plates 3 gain the increased effective area of the ballistic protection both along the entire area of the hard armor plate 3 and along its edges, while the soft ballistic armor plate 2, in the zones of the newly formed hard ballistic parts 5, gains the enhanced ballistic protection against penetration and against blunt trauma effect owing to formation of the one-piece uniform structure.

The soft ballistic parts 6 comprised in the combined armor plate 1 have smaller firmness and smaller thickness of the ballistic material than the firmness and thickness of the combined armor plate 1 in the locations of the formed hard ballistic parts 5, where the one-piece uniform structure provided by the soft ballistic armor plate 2 and the hard armor plate 3 is formed. This allows to preserve flexibility, elasticity, and lightness of the entire combined armor plate 1 with its main area represented by the soft ballistic parts 6.

In separate embodiments of the structure, the firm uniform one-piece structure in the location (or several locations) of the formed hard ballistic part 5 has a straight flat or curved or rounded or multi-radius complex anatomic shape. This allows to make the combined armor plate 1 more ergonomic and convenient for the user.

Also, in separate embodiments of the structure, in order to ensure protection of one specific region of the human body near the vital organ, the combined armor plate 1 may comprise one or several hard armor plates 3 that are arranged in a single region of the combined armor plate 1. During the manufacturing process, this allows to specify and to select the required protection area of the particular region of the combined armor plate 1 from a small one (with one hard armor plate 3) to an enlarged one (with several hard armor plates 3), while at the same time preserving the flexibility of the entire structure.

During the manufacturing process, the proposed structure allows to formation different ballistic resistance of the hard ballistic parts 5 in terms of characteristics depending on a purpose and future usage conditions of the combined armor plate 1. This is achieved by selecting different materials of the hard armor plate 3 and the number of their layers to form the hard ballistic parts 5.

The combined armor plate 1 operates in the following way.

The proposed structure is intended to increase the ballistic resistance in critical locations, i.e., on the specific region or several regions near vital organs of the human user body, that are reinforced by the hard armor plates 3 "at the background" of the total area of the soft ballistic armor plate 2 owing to features of the structure. Thus, upon hitting with the striking elements, all areas of the soft ballistic parts 6 of the combined armor plate 1 "operate" in a standard way as already mentioned and described: they ensure protection against pistol bullets and non-sharp shards having low speed.

The formed uniform zones in the form of the hard ballistic parts 5, where the specific regions of the soft ballistic armor plate 2 are reinforced with the hard armor plates 3, have the increased effective area of the ballistic protection both along the entire area of the hard armor plate 3 and along its edges. Owing to the uniform connection between the soft armor plate 2 and the hard armor plate 3, a material and physical interrelation between them is increased, and, thus, the protection efficiency and expansion of the effective area (in particular, along the edges) of the hard armor plate 3 are enhanced significantly. It is understood that upon hitting the hard ballistic parts 5 with the high-speed shard-ended bullet or shard, the hard armor plate 3 will firstly "operate" as an individual armor plate, while at the same time the hard armor plate 3 "operates" in cooperation with the soft ballistic armor plate 2 "utilizing" its useful ballistic properties as well. At the same time, the soft ballistic armor plate 2 also possesses certain ballistic protection against penetration as well as against blunt trauma effect in the zones of the hard ballistic parts 5 owing to the formation of the one-piece uniform structure. The soft ballistic armor plate 2 also starts to "operate" in cooperation with the upper structural hard armor plate 3 "utilizing" its useful ballistic properties together with its own useful properties.

Upon the formed hard ballistic parts 5 are hit with the striking element, they ensure:
non-penetration in the region of the main area of the hard ballistic part 5;
non-penetration in the region of the edges of the hard ballistic part 5;
reduction of the blunt trauma effect along the entire area of the hard ballistic part 5.

The small area of the hard ballistic parts 5 is intended to protect the critical regions of the user body, while the high total area of the soft ballistic armor plate 2 allows to preserve flexibility, elasticity, and relative lightness of the combined armor plate 1.

Therefore, owing to the combination and integral interconnection of the soft ballistic armor plate 2 and the hard armor plate 3, owing to ratio of their areas, owing to the formed hard ballistic parts 5 having the firm and one-piece uniform structure, owing to the presence of the soft ballistic parts 6 having lower firmness and smaller thickness of the ballistic material than the firmness and thickness of the combined armor plate 1 in the locations of the formed hard ballistic parts 5, the following is achieved:

increasing the ballistic protection against penetration and the blunt trauma effect in specifically selected locations of the combined armor plate, and, thus, in specifically selected vital areas of the human user body;

increasing the effective area of the ballistic protection and resistance of the combined armor plate 1 to penetration and blunt trauma effect in specifically selected locations of the combined armor plate, and, thus, in specifically selected vital areas of the human user body;

preserving flexibility and elasticity of the predominant major part of the armor plate;

preserving usage convenience of the armor plate without any significant increase of its weight.

Industrial applicability and achievement of the technical effects when using the combined armor plate 1 have been confirmed many times during conduction of experimental tests of the pad in practice.

Results of conduction of these tests are depicted in photos 1, 2 which show the depth of recesses on models resulting from making shots with the pistol bullet (TT pistol) to the hard ballistic part 5 of the combined armor plate 1, and the depth of the recesses of the blunt trauma is less than 10 mm.

The exemplary specific industrial embodiment of the proposed invention and its usage are mentioned above as the best exemplary embodiment.

The claimed combined armor plate meets all the requirements for its use, as well as the commonly accepted safety rules for use of such structures in combat conditions.

What is claimed is:

1. A combined armor plate (1) comprising:
a soft ballistic armor plate (2); and
at least one hard armor plate (3);
wherein each of the at least one hard armor plate (3) is arranged in a front part of the combined armor plate (1), while the soft ballistic armor plate (2) is arranged in a rear part of the combined armor plate (1);
wherein each of the at least one hard armor plate (3) has a total area that is smaller than a total area of the soft ballistic armor plate (2);
wherein each of the at least one hard armor plate (3) and the soft ballistic armor plate (2) are interconnected in such a way as to form a firm and one-piece uniform structure in an area (4) of connection between the soft ballistic armor plate (2) and each of the at least one hard armor plate (3);
wherein the soft ballistic armor plate has non-reinforced parts (6) outside the area of connection between the soft ballistic armor plate (2) and each of the at least one hard armor plate (3), the non-reinforced parts (6) having a lower firmness and a lower thickness of a ballistic material than a firmness and a thickness of the combined armor plate (1) in the area (4) of connection between the soft ballistic armor plate (2) and each of the at least one hard armor plate (3); and
wherein each of the at least one hard armor plate (3) is arranged within a region of the combined armor plate (1) that is intended to protect a human body region near a vital organ.

2. The combined armor plate (1) according to claim 1, wherein the firm and one-piece uniform structure has a straight flat or curved or rounded or multi-radius complex anatomic shape.

3. The combined armor plate (1) according to claim 1, further comprising a foamed material in a rear part of the combined armor plate (1).

* * * * *